United States Patent [19]

Williams

[11] Patent Number: 4,482,699

[45] Date of Patent: Nov. 13, 1984

[54] LOW EMITTING AQUEOUS FORMULATIONS OF AMINOPLAST RESINS AND PROCESSES FOR MANUFACTURING THEM

[75] Inventor: James H. Williams, Louisville, Ky.

[73] Assignee: Borden, Inc., Columbus, Ohio

[21] Appl. No.: 516,955

[22] Filed: Jul. 25, 1983

[51] Int. Cl.³ .............................................. C08G 12/12
[52] U.S. Cl. .................................. 528/260; 524/598; 524/843; 525/259
[58] Field of Search ................ 528/259, 260; 524/598, 524/843

[56] References Cited

U.S. PATENT DOCUMENTS

| | | | |
|---|---|---|---|
| 3,102,108 | 8/1963 | Aebi et al. | 260/69 |
| 3,842,039 | 10/1974 | Vargiu et al. | 528/259 |
| 3,896,087 | 7/1975 | Brunnmueller et al. | 260/69 R |
| 3,920,390 | 11/1975 | Petersen et al. | 528/260 |
| 3,931,063 | 1/1976 | Renner | 260/2.5 F |
| 4,021,413 | 5/1977 | Eisele et al. | 260/69 R |
| 4,247,433 | 1/1981 | Schamberg et al. | 528/259 |
| 4,381,368 | 4/1983 | Spurlock | 528/259 |
| 4,409,293 | 10/1983 | Williams | 528/259 |
| 4,410,685 | 10/1983 | Williams | 528/259 |

FOREIGN PATENT DOCUMENTS 532326 10/1956 Canada .

*Primary Examiner*—Theodore E. Pertilla
*Attorney, Agent, or Firm*—Robbins & Laramie

[57] ABSTRACT

Process for preparing a urea-formaldehyde resin in an aqueous formulation particularly intended for use as a particleboard binder. The resin cures to be low emitting. In the cured state, the resin has more than twice as many methylene groups as methylene ether groups, and generally is characterized by residual formaldehyde that is at least 40% and often 50% less than that of a cured resin of the same F/U mole ratio but produced by an initial base catalyzed methylolation procedure of which the primary prepolymer products are mostly monomethylol and dimethylol urea precursors, followed by condensation.

12 Claims, No Drawings

LOW EMITTING AQUEOUS FORMULATIONS OF AMINOPLAST RESINS AND PROCESSES FOR MANUFACTURING THEM

BACKGROUND OF THE INVENTION

The present invention relates to aqueous aminoplast resins based on melamine of urea and formaldehyde, that upon curing are characterized by low formaldehyde emission, to processes for preparing the resins, and to particleboard and other composites made from the resins.

Urea-formaldehyde condensation products are widely used in industry. One important use of these condensation products is as adhesives and binders in the manufacture of particleboard.

Urea formaldehyde (UF) resins have the virtues of low cost, rapid cure, processing convenience, and clear color. Very short press cycles can be achieved with urea formaldehyde adhesives; by adding a catalyst, the rate of cure can be adjusted to essentially any desired speed.

However, whenever an amino-formaldehyde adhesive is used in the production of a structural panel, by whatever process, the generation of formaldehyde fumes remains a problem.

Formaldehyde release is especially noticeable in particleboard and in insulation foams. Both of those contain cured resin films with very large surface areas which enhance formaldehyde release. The causes for formaldehyde release are complex. From the resin itself, free, unreacted formaldehyde may evolve. Also, formaldehyde dissolves in moisture in wood products, and its vapor pressure and its release rate change with changes in air humidity and product humidity. In particleboard, released formaldehyde can come from formaldehyde which was bound to wood cellulose during the hot-press cycle, and which slowly hydrolyzes under the influence of the acidic humidity in the wood. It can also result from the degradation of incompletely cured resin, or resin components, such as methylolurea. Finally, it can result from bulk resin degradation.

The UF resins contain methylol, methylene ether and other reaction products which can hydrolyze back to formaldehyde. The weakest links are in the cellulose-resin link, the hemiacetals, ethers and methylols. The oxygen-free methylene linkage is the most resistant to hydrolysis.

Several paths have been explored over the last few years for reducing formaldehyde release. These include coating applications, chemical treatments before or after resin application, the use of resin additives, and new resin formulations. In such new resin formulations, the mole ratio of formaldehyde to urea has been slowly decreased over the years from its initial high value, but reduction in this ratio generally weakens the internal bond in particleboard, for example, even though it reduces the residual formaldehyde. Some resin manufacturing operations are now programming formaldehyde (F) and urea (U) additions in two stages, to achieve a desired low F/U molar ratio.

One generally accepted two-stage procedure for making urea formaldehyde resins involves the reaction of urea and formaldehyde under alkaline conditions to form methylol ureas, followed by resinifying by further heating under acidic conditions, and finally neutralizing and dehydrating to produce a product of the desired physical characteristics. This procedure requires very accurate control of the pH in the different stages of the process to prevent gelation, and it is at times difficult to obtain consistent physical properties.

Urea and formaldehyde will also react under various conditions of controlled acidity, but gelling systems are usually obtained. For example, if a mixture of one mole of urea and two moles of formaldehyde is maintained under acidic conditions, the mass gels unless steps are taken to interrupt the course of the reaction by the adjustment of the pH at the appropriate times.

In the two-stage, alkaline then acid reaction used for the commercial manufacture of urea-formaldehyde prepolymers, for use in adhesives, the prepolymer resins are made by preparing a urea-formaldehyde solution having a F/U molar ratio ranging from 1.5 to 2.5. This solution is made basic with sodium hydroxide, triethanolamine, triethylamine, ammonia or any appropriate base that will establish a pH in the range of 7.5-8.9.

This basic solution is then brought to reflux for approximately 15-30 minutes, cooled slightly, and the pH is adjusted to a range of approximately 5.5-6.9 using formic acid, p-toluenesulfonic acid or other appropriate organic or inorganic acid. The acidic solution is then brought to reflux until a specific Gardner viscosity has been reached. At this predetermined viscosity point the temperature is dropped slightly, the resin adjusted to a pH of 7.2-7.6, and additional urea is added as required. Water is then removed under vacuum until a desired specific gravity is obtained or a desired percent solids reached. The resin is then cooled and ready for shipment as a prepolymer prior to final cure by the addition of acid.

This prepolymer commercial resin usually has a free formaldehyde content in the range of 0.5%–1.8%, but depending on the resin and its intended application, the free formaldehyde content may be as high as 5%. This two-stage manufacturing procedure results in a prepolymer resin containing methylol, dimethylene ether, and methylenediurea groupings.

The reactions which occur in such processes are of two kinds. Under the mildly alkaline conditions used in the first stage, both monomethylolureas and dimethylolureas are formed. The second stage involves the condensation of methylolureas, under acidic conditions, to form dimethylene ether bridges. Reactions can also occur between the methylol group and the amido hydrogen of urea to form methylene bridges. The subsequent polymerization of cure of such prepolymers normally goes through two distinct stages. The first stage of curve involves the formation of a low molecular weight fusible, soluble resin. The second stage of cure involves a reaction which converts the low molecular weight urea-formaldehyde resin into a high molecular weight network polymer. Cure is usually accomplished by heating under acidic conditions.

It has been postulated that various ether linkages in uncured resins further aggravate hydrolytic degradation in the cured state. There is also a large body of literature on the acid hydrolysis of compounds, having similar structures to that associated with the cured resin, which demonstrates that the different linkages which may exist in cured UF resins could possess wide variations in hydrolytic stability. The following crude order of relative hydrolytic stabilities for possible links in a crude UF network has been postulated: methylene bridge > dimethylene ether bridge > methylol end group.

Many variations U-F condensation techniques have been tried, but there remains a need for a urea-formaldehyde resin which, when cured, will be characterized by low emission of formaldehyde, and will have equal, if not better, adhesive and bonding properties than those associated with current urea-formaldehyde resins.

My copending application Ser. No. 416,573, filed Sept. 10, 1982, now U.S. Pat. No. 4,410,685, discloses a new resin formulation which is hydrolytically stable. The new resin is a urea-formaldehyde liquid base resin comprising urea and formaldehyde in a mole ratio of substantially 1:1. This resin contains essentially no free formaldehyde. When cured, it contains substantially more methylene groups than methylene ether groups. My application also discloses a process for preparing this resin, comprising adjusting a formaldehyde solution containing from about 49.8% to about 50.2% formaldehyde to a pH of 0.5–2.5, slowly charging urea to said formaldehyde solution while maintaining the temperature at 40°–70° C. and the pH at 0.5–2.5, showing the addition of urea to the reaction mixture after attaining a Gardner viscosity in the range of A–D, neutralizing the reaction mixture after obtaining a Gardner viscosity in the range of U−V+, then adding the final charge of urea and permitting equilibration.

A second copending application of mine, Ser. No. 416,574, also filed Sept. 10, 1982, now U.S. Pat. No. 4,409,293, discloses particleboard made from the new resin, and processes of using the resin as a particleboard binder. Both of these applications are expressly incorporated herein by reference.

SUMMARY OF THE INVENTION

The invention provides new low-emitting aqueous formulations of modified aminoplast resins. These formulations can be regarded as based on or improvements on the earlier resin formulations as disclosed in my copending application Ser. No. 416,573, filed Sept. 10, 1982.

These resin formulations can be used to produce composite panels such as particleboard by the mat process, as disclosed in my earlier patent application Ser. No. 416,574, mentioned above.

The preferred resins of the invention are urea-formaldehyde or urea-melamine-formaldehyde resins, of modified skeletal structure as compared to prior art resins. When cured, these resins contain substantially more methylene groups than methylene ether groups. As a result, the resins are more stable and emit less formaldehyde than prior art resins, although their physical properties when cured are comparable to those of prior art resins. The urea-formaldehyde resins produced in accordance with one preferred embodiment of this invention are characterized by a broad range of formaldehyde to urea (F/U) molar ratios of 1.1:1 to 2.3:1.

This invention involves a new condensation technique, developed to maximize the methylene functionality in the cured resin in order to obtain low emission of formaldehyde and yet permit adjustment in the final mole ratio of the resins for optimal performance in each of several different resin applications.

In this new process, there are two stages of condensation and two stages of methylolation. Urea is added in a first, condensation stage, to a very acidic solution of formaldehyde at a rate such that the temperature and mole ratio are controlled to designated parameters. The pH is then adjusted to close to 7 or greater, and an additional charge of urea is added to another designated F/U mole ratio, with additional heating, in this second, methylolation stage. After this methylolation stage, the pH is shifted to the acid side, pH 5.2 to 6.8, and the mixture is heated to reflux, to initiate condensation and polymerization in this, the third stage of the reaction. The end point of this stage is determined by the desired viscosity. For the fourth stage, the pH is made alkaline again, 7.3–7.5, and a fourth increment of urea is added, to an F/U molar ratio in the range of 1.1:1 to 2.3:1. The second methylolation reaction begins with the addition of urea and can continue at room temperature during storage.

The base resin thus produced is characterized in that it contains a higher degree of methylene groups in the cured resin.

The resin formulations of this invention can be sprayed on lignocellulosic furnish as binders, in the manufacture of particleboard, fiberboard and other composite panels. Since these composite products are produced from different wood species, by different producers often using different equipment, and having different furnish sizes and cure speed requirements, in the practice of the process the several process and product parameters are adjusted as necessary to meet the needs of individual producers. Generally, the amount of resin sprayed on the furnish may be in a range that provides from 5% to about 10% of dry binder solids based on the dry (oven-dried) weight of the finished board.

DETAILED DESCRIPTION OF THE INVENTION

The process of the invention selectively synthesizes a urea-formaldehyde prepolymer in several stages of urea addition and reaction. The initial reaction is a condensation reaction, under acidic conditions. The reaction in this stage minimizes the dimethylene ether linkages in the fused polymer by maximizing the methylene bridges. The second stage, methylolation reaction is conducted at a somewhat alkaline pH. The third stage condensation and plymerization is carried out at an acidic pH. A final urea addition is preferably made, at a mildly alkaline pH, to adjust the F/U mole ratio to within the preferred final range of 2.3:1 to 1.1:1. Methylolation then occurs spontaneously.

This four-stage process results in selective condensation and yields low-emitting aqueous resin formulations.

The procedure of the present invention not only results in lowering formaldehyde emissions from maximization of the methylene functionality in the cured resin, but also permits the preparation of resins at different final F/U mole ratios, without substantial loss of internal bond strength relative to conventional resins.

First Stage

The process begins with a catalyzed reaction in a strongly acidic environment. This not only forms the methylene urea function and their condensation products, but the exothermic character of the reaction eliminates the need for the application of heat during the initial stage. The exotherm is sufficient to drive the reaction to the desired level of condensation, and can be controlled by a programmed slow or incremental addition of urea to the acidified formaldehyde solution.

More specifically, in accordance with one preferred embodiment of the invention, the initial formaldehyde solution is adjusted to its highly acidic pH by the addition of an appropriate acid. Then urea is slowly added to the acidic formaldehyde solution so as to maintain a temperature of 90° C. or less in the exothermic reaction mixture. The urea preferably is charged incrementally until a particular mole ratio is reached.

The formaldehyde solution used preferably contains about 49.8% to about 50.2% formaldehyde. Although other formaldehyde solutions, e.g., 37%, could be utilized, it is preferred to use the 49.8%-50.2% solutions because they more easily yield a resin having the desired solids content. If a formaldehyde solution of lesser concentration than about 50% is utilized, the final product should be adjusted in solids content by conventional techniques to have the desired specifications discussed below.

The pH of the formaldehyde solution is adjusted to a pH of 0.5-2.5, preferably about 1.0, using any suitable inorganic or organic acid. Suitable acids include, but are not limited to, formic acid, hydrochloric acid, sulfuric acid and p-toluenesulfonic acid, or a combination of two or more of these. Of these acids, sulfuric acid is preferred.

The amount of urea which is added to the formaldehyde solution during this initial reaction stage is sufficient to provide an F/U molar ratio of 4.0:1 to 2.5:1, with a preferred mole ratio of 3.5:1 to 2.8:1.

According to one preferred mode of practicing the process, the F/U mole ratio at the end of this first stage of the reaction is in the range of 3.5:1 to 2.5:1. The most preferred mole ratio of 3.25:1 corresponds to a reaction mixture made up from 77.77%-66.66% by weight of the formaldehyde solution, which corresponds to 38.33%-33.33% by weight of formaldehyde per se (the remainder being water), and 22.23%-33.34% by weight of urea.

In this initial reaction step, the urea is added slowly so that the exothermic reaction maintains the heat of the reaction mixture at an elevated temperature that permits condensation to occur, preferably in the range from about 50° C. to about 99° C. The urea is added in increments, and it is preferred to add it in about fifteen equal increments. Alternatively, the increments of urea can be added at equal time intervals, or at a continuous, slow rate. After all of the urea has been added, the mixture is stirred at the final temperature for approximately 10 minutes. This first reaction stage serves the purpose of developing methylene bridges.

Second Stage

The preferred way of conducting the second stage, to achieve methylolation, is described in detail below. It involves the steps of (1) adjusting pH to a generally neutral or slightly basic value; (2) adding urea; (3) holding the reaction mixture, with stirring, for a period of time, at a temperature of 50° C. or higher, preferably at 50° C. to 80° C., to permit the methylolation reaction to go forward slowly; (4) readjusting the pH, if necessary, to neutral or slightly basic; (5) adding more urea to a F/U mole ratio of 2.5 to 1.5, then refluxing for a short period of time to force the methylolation.

While this incremental addition of urea is preferred, it is not essential. As an alternate, all of the urea can be added in a single charge. However, the dwell periods, first at preferably 50° C.-80° C. for slow methylolation, then at reflux for a forced reaction, should be used in that sequence, after the urea has been added.

In the preferred practice of the second stage of the process, the pH is adjusted to 6.9-7.8, more preferably 7.3-7.5, by the addition of any suitable inorganic or organic base. The pH should be approximately neutral, or preferably basic. There is nothing critical about the suggested upper pH figure of 7.8, however; a higher pH could be used. Suitable bases for adjusting the pH include, but are not limited to, sodium hydroxide, ammonia, triethanolamine and triethylamine, of a combination of two or more of these. It is preferred to use a combination of sodium hydroxide and triethanolamine, preferably a 50% solution of sodium hydroxide and triethanolamine in a 50/50 ratio by weight. An addition of urea is then made.

This addition of urea is sufficient in amount to provide an F/U mole ratio of 3.0:1 to 1.8:1. The preferred F/U mole ratio is 2.8:1 to 2.0:1, and the most preferred ratio is 2.5:1. The reaction mixture is stirred and the temperature is held at a temperature above 49° C., preferably from about 50° C. to about 80° C., for about one-half hour after the urea addition has been completed, to permit methylolation to occur.

After holding the stirred reaction mixture for about 30 minutes, the reaction mixture is readjusted to pH 7.3-7.8, if necessary. Another addition of urea is then made, in the amount necessary to provide an F/U mole ratio in the range from 2.5:1 to 1.5:1. The preferred F/U mole ratio is 1.8:1 to 1.6:1.

After this addition of urea and a subsequent pH adjustment to 6.9-7.8, preferably 7.3-7.4, if necessary, the reaction mixture is heated to maintain a gentle reflux for about 15 minutes, to force methylolation.

Third Stage

The pH is then adjusted to 5.2-6.8 with 30% formic acid. Other inorganic or organic acids such as hydrochloric, sulfuric, acetic, toluenesulfonic acid, or any combination of these can be used, however, formic is the preferred acid due to its availability, activity, ease of handling, and cost.

At a pH of 5.2-6.8, the reflux is continued until a predetermined Gardner viscosity is reached. This viscosity may range from a low "D/E" for certain resin applications, to a "T/U" for resins that will be used as adhesives and binders for particleboard manufacturing. During the reaction that occurs at the acidic pH, it is believed that condensation and polymerization occur, since the viscosity increases as refluxing is continued.

Fourth Stage

After the desired viscosity is reached, the reaction is cooled to below the boiling point of water, preferably to 90° C., and the pH is adjusted to 7.2-7.8, with a suitable base. At this stage, the resin may or may not be stripped of water to bring about a desired specific gravity or solids content prior to the final addition of urea.

The final, small urea addition adjusts the F/U mole ratio in fine-tuning fashion. Depending on the intended use for the resin, the final mole ratio will fall in the range from 2.3:1 to 1.1:1. After the final adjustment addition of urea, the pH is again adjusted to 7.2-7.8, with a preferred range of 7.4-7.6, with either an acid or base, as appropriate. It is believed that methylolation begins in this stage with the addition of urea, and can continue at room temperature during storage.

Such things as magnesium chloride may also be added, and water may be removed to achieve a particular specific gravity, if desired. The reaction is sufficiently complete at this point, and the urea-formaldehyde resin may be used as is.

General

The final resin product generally is a solution in an aqueous vehicle and has a solids contant of 45%–65% and a viscosity in the range of 60–600 as measured on a Brookfield RVF viscometer using a No. 1 spindle at 20 rpm at 25° C.

Even when the process is practiced with some departures from the preferred embodiments, the base resin product, and products in which it is used as an adhesive or binder, will have negligible formaldehyde emission. The resins, in addition, can be formulated to have acceptable storage lives even at elevated temperatures up to 90° F.

The urea-formaldehyde resin products can be structurally analyzed using conventional techniques. These techniques allow the determination of the following structural groups in the uncured resins as well as in the cured resins: free formaldehyde, total formaldehyde, methylol, methylene, and methylene ether. The resins are cured for this purpose of adding 2% ammonium chloride, based on the weight of the resin, and heating at 115° C. for fifteen minutes. The cured resins are found to contain substantially more methylene groups than prior art urea-formaldehyde resins, especially those produced by an initial base catalyzed methylolation procedure of which the primary prepolymer products are mostly monomethylol and dimethylol urea precursors, followed by condensation.

A representative comparison of the quantitative analyses of several different F/U mole ratio resins, both liquid (i.e., as produced) and cured, prepared according to preferred embodiments of the present invention, and identical mole ratio conventional (prior art) resins, produced by an initial base catalyzed methylolation procedure of which the primary prepolymer products are mostly monomethylol and dimethylol urea precursors, followed by condensation, are reported in Table II, below.

The reduced formaldehyde emission as compared to prior art resins can be demonstrated by preparing particleboard specimens and observing their respective emissions. Particleboard specimens prepared using the present resins have significantly lower formaldehyde emission than particleboard specimens made with the prior art resins. The resins of the invention have similar properties to those of prior art, and most important, these new resins develop internal bond strengths that can be substantially equivalent to those of conventional resins, while minimizing formaldehyde emissions.

In addition, the new processes of the invention have flexibility as to the final F/U mole ratios of the resins while still maintaining low emission characteristics relative to conventional resins of the same F/U mole ratios. These results are further demonstrated in the examples that follow.

In these examples, and elsewhere throughout the specification, all parts and percentages are by weight, as is, and temperatures are in degrees Celsius, unless expressly indicated to be otherwise. Unless otherwise specified, viscosity determinations were made using a Brookfield RVF viscometer, No. 1 spindle at 20 rpm and at 25° C. (abbreviated RVF 1/20/25° C.). The resin products of the following examples are intended for particleboard binder applications. The different mole ratios permit the accommodation of the needs of different customers.

EXAMPLE 1

Production of a Low Emission Resin

A reactor is charged with 64.32 parts (1.07 mols) of formaldehyde assayed at 50%. The formaldehyde is stirred and the pH is adjusted to 0.87 with approximately 0.065 parts of concentrated sulfuric acid. After adjusting the temperature to 50° C., 19.78 parts (0.3297 mols) of urea are added in fifteen equal increments over a 15-minute time period. The temperature is held at the final temperature of 86° C. for approximately 10 minutes after the last addition of urea.

The pH is then adjusted to 7.51 with 0.42 parts of 50% sodium hydroxide. A second increment of urea is charged after the pH adjustment, 5.94 parts (0.099 mols), and the reaction is stirred at 80° C. for 30 minutes. A third charge of urea, 3.50 parts (0.0583 mols), is then added and the reaction mixture is brought to reflux and held there for 15 minutes.

The pH is then adjusted to 5.97 with 30% formic acid and reflux is continued until a Gardner viscosity of "E+" is reached. When this viscosity is reached, the pH is adjusted to 7.78 with triethanolamine and the reaction mixture is concentrated under vacuum to a specific gravity of 1.268 by removing approximately 7.47 parts of water.

The addition of 1.88 parts sodium chloride and 11.395 parts (0.1899 mols) of urea is followed by a pH adjustment to 7.85 with 30% formic acid. The reaction mixture is then cooled to 15° C. The final product has a 64.4% solids content, a specific gravity of 1.288, and a Brookfield viscosity (RVF 1/20/25° C.) of 247 cps.

This product is representative of U-F resin products designed to suit the needs of certain particleboard binder applications. The specifications for products that would be suitable include a 64%–66% solids contant, a specific gravity of 1.286 to 1.292, a pH of 7.5–7.9, and a Brookfield viscosity of 230–400 cps.

EXAMPLE 2

Comparison Process Using Alkaline-Acid Condensations in the First Two Stages A reactor is charged with 64.85 parts of 50% assay formaldehyde. The solution is stirred and the pH is adjusted to 7.2 with approximately 0.11 parts triethanolamine. After the pH adjustment, 29.46 parts of urea are charged, the pH adjusted again to 7.2, and the mixture is refluxed for 30 minutes.

Following the half-hour reflux stage, the pH is adjusted to 6.0 with 30% formic acid and reflux is continued until a Gardner viscosity endpoint of E+ is obtained. The pH is again adjusted to 7.4 with triethanolamine and 7.53 parts water are then removed by vacuum distillation.

After distillation, 1.9 parts sodium chloride and 11.04 parts of urea are charged to the reaction batch. The pH is then again adjusted to 7.6 with both 30% formic acid and triethanolamine. The batch is cooled to 25° C. and discharged.

The final product had a solids content of 64.03%; a specific gravity of 1.286; a pH of 7.75, and a Brookfield viscosity of 240 cps.

The specification ranges for this type of product are: solids content, 64%–66%; specific gravity, 1.286–1.292; viscosity as determined by a Brookfield RVF 1/20/25° C., 230–400 cps; pH 7.5–7.9.

EXAMPLE 3

Production of a Low-Emission Resin Starting with Formation of a Precondensate

This example demonstrates the use of a urea-formaldehyde precursor or precondensate.

In the manufacture of urea-formaldehyde resins, prilled urea is often used as a raw material. Unfortunately, some of the prilled urea is usually crushed during transportation and handling, before it can be used. During storage, some urea cakes and forms hard "chunks" from pressure and exposure to moisture. The chunk and crushed materials are referred to as "overs and unders" respectively, since they deviate from the standard size range for urea prills. The overs and unders usually sell at a discount.

The use of overs and unders to form a precondensate offers at least two advantages, that of economy, and that of forming a stable precondensate that has a more generalized utility than that in resin manufacture. This precondensate production process is more fully described in my copending patent application, Ser. No. 584,441, filed Feb. 28, 1984, which is incorporated herein by reference.

In a preferred mode, this precondensate is derived from urea and a 50% formaldehyde solution, although paraformaldehyde and aqueous formaldehyde of other concentrations can be used. This precondensate production process requires no application of heat, no base catalyzed methylolation, and can be manufactured in one-fifth the time required for the production of prior art precondensates or concentrates.

The urea-formaldehyde precondensate is generally characterized by an F/U molar ratio of 5:1 to 1.75:1, a preferred F/U molar ratio of 3:25 to 2.25:1, a more preferred F/U molar ratio of 2.6:1 to 2.4:1, and most preferred ratio of 2.5:1. It contains in one preferred embodiment 28.5% urea and 35.5% formaldehyde.

The precondensate is prepared by a process in which urea is added to a very acidic solution of formaldehyde at a rate such that the exotherm and mole ratio are controlled. Thus, the formaldehyde solution is adjusted to a pH of 0.5-1.0 and urea is then slowly added until a preselected mole ratio of formaldehyde to urea is reached. When the targeted ratio has been attained, the pH of the solution is raised to 7.7-7.9 and additional urea is added to an F/U mole ratio of 2.6:1-2.4:1. The resulting urea-formaldehyde precondensate is stable.

To demonstrate the use of such a precursor in the production of condensate, 3052 grams of a 50% formaldehyde solution are charged to a reactor, and agitation and stirring are initiated. The pH of the formaldehyde solution is adjusted to less than or equal to 1 using approximately 3.6 grams of concentrated sulfuric acid. The temperature of the solution is raised to 50° C. Then 937.6 grams of prilled urea, including overs and unders, are charged to the formaldehyde solution is fifteen equal increments over a 15-minute time period in such a manner as to maintain the temperature between 50° C. and 95° C. The prilled urea may be either charged in increments or it may be continuously added over a 15-minute time period, at a slow rate.

After the urea is charged, the mixture is held at 95° C. for five minutes and the pH is adjusted to 7.7-7.9 with 50% sodium hydroxide. After adding 283.2 g. of additional urea to the reaction mixture, it is then cooled to 15° C. and discharged to an appropriate container.

The F/U mole ratio of the urea-formaldehyde precondensate is 2.5:1, the viscosity is 89 cps, the pH is 7.5 and calculated solids are 64%.

A reactor is then charged with 90.87 parts of the precondensate. The precondensate is stirred and adjusted to a 7.2 pH with 0.11 parts thiethanolamine. To this is added 34.7 parts of urea and the mixture is refluxed for one-half hour. The pH is adjusted to 6.0 with 0.06 parts of 30% formic acid and condensed to an "E/E+" Gardner viscosity.

Next, the pH is adjusted to 7.4 with approximately 0.11 parts triethanolamine and vacuum concentrated with the removal of 7.5 parts water. Sodium chloride, 1.89 parts, and 10.99 parts of urea are added and the final pH is adjusted to 7.7. The final product has a solids content of 65%, a viscosity (RVF 1/20/25° C.) of 225 cps and a specific gravity of 1.289.

EXAMPLES 4, 7 and 10

Production of Low-Emission Resin Formulations at Different F/U Mole Ratios

These three examples demonstrate the production of resin formulations at different F/U mole ratios, using processes that follow generally the procedure used in Example 1. A summary of the formulations is shown below, with the resin of Example 1 included for comparison.

| First Stage Acid Condensation Formulations | | | | |
|---|---|---|---|---|
| | Parts by Weight, As Is | | | |
| | Example 1 | Example 4 | Example 7 | Example 10 |
| Formaldehyde (50% solution) (mols) | 64.32 (1.072) | 60.35 (1.006) | 57.04 (0.9507) | 52.09 (0.868) |
| Sulfuric Acid | 0.065 | 0.10 | 0.04 | 0.10 |
| Urea, parts (mols) | 19.78 (0.3297) | 18.56 (0.3093) | 17.54 (0.2923) | 16.03 (0.267) |
| Sodium Hydroxide (50% solution) | 0.42 | 0.40 | 0.08 | 0.43 |
| Urea, parts (mols) | 9.44 (0.1573) | 8.88 (0.148) | 8.37 (0.1393) | 7.64 (0.1273) |
| Formic Acid (30% solution) | 0.06 | 0.06 | 0.010 | 0.03 |
| Triethylamine | — | — | 0.03 | 0.10 |
| Triethanolamine | 0.11 | 0.11 | — | — |
| Distillate | 7.47 | 7.50 | 5.82 | — |
| Urea, parts (mols) | 11.395 (0.1899) | 19.04 (0.3173) | 19.76 (0.3293) | 20.90 (0.3483) |
| Sodium Chloride | 1.88 | — | 2.37 | 2.18 |
| Magnesium Chloride | — | — | 0.53 | 0.50 |
| Solids | 64.90 | 64.55 | 68.41 | 66.66 |
| Viscosity | 247 | 154 | 323 | 271 |
| Specific Gravity | 1.288 | 1.278 | 1.290 | 1.294 |
| F/U Mole Ratio | 1.584:1 | 1.299:1 | 1.249:1 | 1.169:1 |

EXAMPLES 6, 9 AND 12

Production of Low-Emission Formulations at Different F/U Mole Ratios, Using Precondensate These three examples demonstrate the production of resin formulations with the use of a urea-formaldehyde precondensate prepared as in Example 3. The formulations listed below were prepared following the same general overall process outlined in Example 3 above.

| First Stage Acid Condensation Formulations | | | | |
|---|---|---|---|---|
| | Parts by Weight, As Is | | | |
| | Example 3 | Example 6 | Example 9 | Example 12 |
| Precondensate of Example 3 | 90.80 | 86.95 | 79.96 | 73.38 |
| Triethanolamine | 0.11 | 0.11 | 0.12 | 0.10 |
| Urea | 3.47 | 3.33 | 3.06 | 2.80 |
| Formic Acid (30%) | 0.06 | — | 0.066 | 0.03 |
| Triethylamine | — | — | 0.046 | 0.10 |
| Triethanolamine | 0.11 | — | 0.046 | 0.10 |
| Distillate | 7.43 | 9.88 | 5.822 | — |
| Sodium Chloride | 1.89 | — | 2.36 | 2.18 |
| Urea | 10.99 | 19.49 | 19.68 | 20.91 |
| Magnesium Chloride | — | — | 0.53 | 0.50 |
| Solids | 62.85 | 65.6 | 67.81 | 65.54 |
| Viscosity | 160 | 328 | 449 | 333 |
| Specific Gravity | 1.280 | 1.280 | 1.289 | 1.289 |
| Total Urea, Wt. | 35.9 | 43.34 | 41.61 | 40.06 |
| (mols) | (0.598) | (0.722) | (0.693) | (0.688) |
| F/U Mol Ratio | 1.60:1 | 1.30:1 | 1.25:1 | 1.17:1 |

EXAMPLES 5, 8 AND 11

Comparison Procedures: Alkaline then Acid Reactions

These three examples, 5, 8 and 11, are typical resins produced by an initial base catalyzed methylolation procedure of which the primary prepolymer products are mostly monomethylol and dimethylol urea precursors, followed by condensation, that demonstrate by comparison, the novelty and uniqueness of the resins of this invention, produced by an initial acid condensation procedure. The procedures used in making the formulations below follow generally the procedure in Example 2.

| Conventional First Stage Acid Methylolation Formulations | | | | |
|---|---|---|---|---|
| | Example 2 | Example 5 | Example 8 | Example 11 |
| Formaldehyde (50%) | 64.85 | 60.59 | 57.32 | 52.32 |
| (mols) | (1.08) | (1.01) | (0.9553) | (0.872) |
| Triethanolamine | 0.11 | 0.11 | 0.12 | 0.10 |
| Urea | 29.46 | 27.55 | 26.04 | 23.77 |
| Formic Acid (30%) | 0.06 | 0.06 | 0.03 | 0.03 |
| Distillate | 7.53 | 7.54 | 6.38 | — |
| Triethylamine | — | — | 0.11 | 0.10 |
| Triethanolamine | 0.11 | 0.11 | — | — |
| Urea | 11.04 | 19.12 | 19.85 | 20.99 |
| Sodium Chloride | 1.9 | — | 2.38 | 2.19 |
| Magnesium Chloride | — | — | 0.53 | 0.50 |
| Solids | 64.2 | 64.69 | 65.06 | 62.87 |
| Viscosity | 235 | 330 | 310 | 266 |
| Specific Gravity | 1.284 | 1.280 | 1.287 | 1.269 |
| Total Moles Urea | 0.675 | 0.778 | 0.7648 | 0.746 |
| F/U Mole Ratio | 1.6:1 | 1.3:1 | 1.25:1 | 1.2:1 |

Examination of Properties

Products prepared according to the invention as in Examples 1, 4 and 7, were subjected to a storage life test at 70° F., were compared with conventionally produced products made using an alkaline-acid process, as in Examples 2, 5 and 8. The results are reported below in Table I, where the viscosity measurements are reported after the indicated number of days.

TABLE I
Storage Lives of Several Products
(Brookfield Viscosity in cps: RVF, 1/20/25° C.)

| | Days at 70° F. | | | | | | |
|---|---|---|---|---|---|---|---|
| Example No. | 1 | 3 | 6 | 12 | 20 | 30 | 40 |
| 1 | 247 | 170 | 180 | 200 | 200 | 200 | 200 |
| 2 | 235 | 240 | 250 | 260 | 320 | 370 | 390 |
| 4 | 154 | 195 | 290 | 310 | 295 | 310 | 310 |
| 5 | 330 | 290 | 310 | 310 | 320 | 330 | 330 |
| 7 | 323 | 335 | 350 | 425 | 500 | 710 | 1000 |
| 8 | 310 | 310 | 310 | 320 | 365 | 460 | 470 |

Comparative analyses were made of a product made according to the invention, following generally the Example 1 procedure, and a product made by an alkaline-acid process, following generally the Example 2 procedure. The analyses were made on the product as produced, and also after curing under conditions representative of those encountered in particleboard manufacture. The results are reported in Table II, below.

In Table II, the reported methylene content was determined by subtracting both free formaldehyde and oxidable formaldehyde in the resin from the total formaldehyde used in preparing the resin. Oxidable formaldehyde is defined as the total formaldehyde resulting from both the methyol and methylene ether functional groups, plus free formaldehyde. The methylene contents of the new resins of this invention are substantially greater in the cured resins than in cured resins made by conventional prior art processes. The new initial acid condensation techniques, therefore, are believed to yield a low-emitting aqueous formulation as a result of maximizing the methylene functionality.

TABLE II
Summary of Functional Groups in
1.6 Mole Ratio UF Resins

| | Initial Acid Condensation; Example 1 | | Initial Base Condensation; Example 2 | |
|---|---|---|---|---|
| | Liquid | Cured | Liquid | Cured |
| Free Formaldehyde | 7.22% | 5.74% | 8.72% | 4.59% |
| Methylol | 64.50 | 9.16 | 57.32 | 6.67 |
| Methylene Ether | 11.21 | 15.97 | 12.19 | 43.59 |
| Methylene | 17.07 | 69.13 | 21.77 | 45.15 |
| Total Formaldehyde | 100.00% | 100.00% | 100.00% | 100.00% |

Similar comparative analyses were made with respect to products prepared following generally the techniques of Examples 4 and 5, respectively. The results are reported in Table III, below.

TABLE III
Summary of Functional Groups in
1.3 Mole Ratio UF Resins

| | Initial Acid Condensation; Example 4 | | Initial Base Condensation; Example 5 | |
|---|---|---|---|---|
| | Liquid | Cured | Liquid | Cured |
| Free Formaldehyde | 0.35% | 0.55% | 1.07% | 0.25% |
| Methylol | 44.63 | 4.89 | 52.28 | 5.34 |
| Methylene Ether | 22.70 | 25.96 | 19.96 | 32.61 |
| Methylene | 32.32 | 68.60 | 26.69 | 61.80 |
| Total Formaldehyde | 100.00% | 100.00% | 100.00% | 100.00% |

COMPARATIVE DEMONSTRATION OF PARTICLEBOARD PRODUCTION

Particleboard test specimens were prepared using binders based on the resins of Examples 3, 6, and 9.

These resins are regarded as low fuming or low formaldehyde emitting resins. Test speciments were similarly prepared using binders based on resins made by conventional first stage (alkaline) methylolation techniques, i.e., Examples 2, 5, and 8.

In each case, Southern pine core furnish (approx. oven dry moisture content [M.C.], 3.0%–4.5% as determined by a Cenco Direct Reading Moisture Balance), was placed in a rotary drum blender (measuring 48" in diameter by 24" wide) and continuously tumbled. The liquid resin binder was applied at the rate of 8.0% of dry resin solids per 100 parts of oven dry (O.D.) wood, with a spray nozzle producing a cone configuration pattern at approximately 7 psi atomizing pressure. The flow through the nozzle was at a rate of approximately 100 grams of liquid resin/minute.

The test specimens were manufactured using resin binder with and without external catalysis. When used, the catalyst was added to the resin prior to spraying, at a rate of 2.0 solid parts acid salt to 100 grams liquid resin.

The amount of untreated furnish used in blending was large enough to manufacture four laboratory board samples $14\frac{1}{2}"$ square, $\frac{5}{8}"$ (0.625") thick, with an oven dry density of approximately 45 lbs./cubic ft. A mat was formed using the treated furnish and a forming box prior to pressing. The laboratory test specimen boards were pressed between two aluminum cauls ($\frac{1}{4}"$ thick $\times 18" \times 22"$). Treated moisture content was determined on the Cenco Direct Reading Balance.

The press used was a single operating press with a 12" hydraulic ram. The total press cycles were either 3.50 minutes or 2.75 minutes in duration, or 3.00 and 2.25 minutes. The press was closed with increasing pressure from 0–755 psi on the mat until the target thickness was reached, in approximately 1.0 to 1.5 minutes, and then the pressure was reduced, holding the board thickness constant for the remainder of the cycle.

The test boards (2 from each press cycle) were then cooled at room temperature. In the cooling process, the sample boards stickered for cooling, roughly $14\frac{1}{2}$ square, were trimmed to a $12\frac{1}{2}$ square and cut into two $5" \times 12\frac{1}{2}"$ strips and one $2" \times 12\frac{1}{2}"$ strip. The two $5" \times 12\frac{1}{2}"$ strips were then cut into eight $5" \times 2\frac{3}{4}"$ samples for residual formaldehyde testing, and the single 2" strip from each of the four stickered boards was cut into six $2" \times 2"$ squares for internal bond testing.

The boards manufactured were tested for oven dried density, internal bond strength, residual formaldehyde emission, according to the National Plywood Association (NPA) sanctioned 2-hour desiccator procedure, and a hydrolysis test was used to determine any degradation in internal bonds after prolonged exposure to constant temperature and humdity.

The NPA-sanctioned desiccator procedure was used to determine the amount of residual formaldehyde given off by particleboard and absorbed into a 25 ml. sample of distilled water to give resuts in micrograms of formaldehyde per milliliter of water. The only modification to this method that was used was the elimination of the 15-minute boil of the test tubes after the addition of the concentrated sulfuric acid to develop color prior to evaluation on the spectrophotometer. Due to a private study which compared the boil and non-boil conditions, there is believed to be no significant change in color development with the omission of the boil. This modification speeds up the procedure.

The samples measuring $5" \times 2\frac{3}{4}"$ were randomized at each of the specific press process conditions prior to being placed in the desiccator.

The density of the boards was determined after exposure to the desiccator method discussed above. Half of the $5" \times 2\frac{3}{4}"$ samples were used to determine the oven dried density of the board samples. Eight samples per condition were used to obtain an average value according to NPA test procedures 4.4.2 and 4.4.3. The moisture content was determined according to NPA procedure 4.5.

Samples for internal blood determinations, measuring $2" \times 2"$, were tested in a Tinius Olson Universal Testing machine with a 24,000 pound load capacity. The internal bonds were determined according to procedure 4.7 of the NPA.

Six hundred (600) parts of binders formulated from the resins of Examples 8 and 9, respectively, were sprayed into 5025 parts of Southern yellow pine core containing approximately 6.7% moisture, and the resulting mixtures were then pressed into boards with dimensions measuring $\frac{3}{4}" \times 14\frac{1}{2}"$ square.

The resins of Examples 2, 3, 5, and 6 were formulated as externally catalyzed binders by adding 12 parts of a 40% ammonium sulfate solution to 600 parts of each liquid resin, respectively. These externally catalyzed resin binders were sprayed onto pine core under the same conditions.

A platen temperature of 340° F. was used along with two total press cycles of 3.00 and 3.75 minutes for all formulations.

The results reported in Tables IV–VI, below, show that the internal bond strengths achieved using the new resins made according to the present invention, i.e., those of Examples 3, 6 and 9, are equal to those samples made using resin binders prepared by the conventional or base methylolated method, i.e., those of Examples 2, 5 and 8, while the desiccator values observed are at least 50% lower. For example, the 1.3 conventional mole ratio resin of Example 5, at a 3.5 minute press cycle, produces 1.31 ug/ml, whereas the same mole ratio acid condensed resin, Example 5, produces 0.37 ug/ml. The 71% reduction in emission is directly related to the percent methylene functionality as outlined in Table II, above.

TABLE IV

UREA-FORMALDEHYDE RESIN @ 1.25 F/U MOLE RATIO AND TWO PRESS CYCLES

| | Press Cycle @ 340° F. | | | |
|---|---|---|---|---|
| | 3.5 Minutes | | 2.75 Minutes | |
| Resin of Example No. | 8 | 9 | 8 | 9 |
| Treated Furnish, M.C. % | 7.3 | 7.0 | 7.3 | 7.0 |
| Resin Application, % resin solids, dry basis | 8.0 | 8.0 | 8.0 | 8.0 |
| Physical Properties of the Board | | | | |
| Density, #/Ft³ O.D. | 44.6 | 43.8 | 43.1 | 43.4 |
| Internal Bond, psi | 163 | 139 | 131 | 123 |
| Residual Formaldehyde (2 hr.) Desiccator Value mg/ml | 1.00 | 0.45 | 1.02 | 0.47 |

TABLE V

UREA FORMALDEHYDE RESIN @ 1.30 F/U MOLE RATIO AND TWO PRESS CYCLES

| | Press Cycle @ 340° F. | | | |
|---|---|---|---|---|
| | 3.5 Minutes | | 2.75 Minutes | |
| Resin of Example No. | 5 | 6 | 5 | 6 |
| Treated Furnish, M.C. % | 7.6 | 7.5 | 7.6 | 7.5 |

TABLE V-continued

UREA FORMALDEHYDE RESIN @ 1.30
F/U MOLE RATIO AND TWO PRESS CYCLES

|  | Press Cycle @ 340° F. | | | |
| --- | --- | --- | --- | --- |
|  | 3.5 Minutes | | 2.75 Minutes | |
| Resin Application, % resin solids, dry basis | 8.0 | 8.0 | 8.0 | 8.0 |
| Catalyst, Solids, pts. (40% (NH4)2SO4) | 0.8 | 0.8 | 0.8 | 0.8 |
| Physical Properties (⅜") of the Board |  |  |  |  |
| Density, #/Ft³ O.D. | 45.0 | 42.8 | 45.0 | 44.1 |
| Internal Bond, psi | 136 | 123 | 127 | 146 |
| Residual Formaldehyde (2 hr.) | 1.31 | 0.37 | 1.64 | 0.41 |
| Desiccator Value mg/ml |  |  |  |  |

TABLE VI

UREA-FORMALDEHYDE RESIN @ 1.60
F/U MOLE RATIO AND TWO PRESS CYCLES

|  | Press Cycle @ 340° F. | | | |
| --- | --- | --- | --- | --- |
|  | 3.00 Minutes | | 2.25 Minutes | |
| Resin of Example No. | 2 | 3 | 2 | 3 |
| Treated Furnish, M.C. % | 8.1 | 6.4 | 8.1 | 6.4 |
| Resin Application % resin solids, dry basis | 6.75 | 6.75 | 6.75 | 6.75 |
| Catalyst, Solids, pts. (20% (NH4)2SO4) | 1.0 | 1.0 | 1.0 | 1.0 |
| Physical Properties (⅜") of the Board |  |  |  |  |
| Density, #/Ft³ O.D. | 44.7 | 42.4 | 44.5 | 42.1 |
| Internal Bond, psi | 104 | 82 | 104 | 84 |
| Residual Formaldehyde (2 hr.) | 8.2 | 4.8 | 9.3 | 4.9 |
| Desiccator Value mg/ml | 8.2 | 4.8 | 9.3 | 4.9 |

CONCLUSION

The process of the invention is a four-stage process. There are two stages of condensation and two stages of methylolation.

As has been demonstrated, the resins of this invention have more methylene linkages in the cured form than prior art, alkaline-acid produced resins. Thus, Tables II and III report the functional groups in two of the resins produced in the examples. The 1.6:1 mole ratio resin of the invention, as reported in Table II, has 69.13% methylene functionality, whereas the 1.6:1 mole ratio prior art cured resin has a methylene content of only 45.15%. A similar relationship can be observed for the 1.3:1 mole ratio resins in Table IV.

In the process of the invention, the initial acid condensation is followed by a basic methylolation, which is followed by another acid condensation. This sequence of steps generates higher internal bond strength in the cured board made with the resin than can be obtained with the low emission, low F/U mole resins produced in accordance with my earlier copending application, Ser. No. 416,573, filed Sept. 10, 1982. This is important in many applications for the resins.

The data in Tables II and III demonstrate that resins produced according to the invention will have low emission characteristics, since methylene functionality has been maximized.

In place of the urea component of the base resin, up to 8% by weight of melamine, based on the aqueous solutions of the resin solids, can be used. Thus, if the urea component of a particular resin were to be, for example, 24% by weight, the balance being about 36% formaldehyde, and water, then a suitable product can be prepared by using, instead of 24% urea, a mixture that will lead to a product that is 16% urea and 8% melamine.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A four-stage process for preparing a urea-formaldehyde resin, that has two stages of condensation and two stages of methylolation, comprising:
   (a) adding urea to a highly acidic aqueous solution of formaldehyde having an initial pH not above 2.5, at an elevated temperature of 50° C. or higher, that permits condensation to occur, until the mol ratio of formaldehyde to urea (F/U) is in the range from about 4.0:1 to 2.5:1;
   (b) adjusting the pH substantially to a neutral or alkaline value for methylolation, then adding more urea at a temperature of at least 50° C. to an F/U mole ratio of 2.5:1 to 1.5:1, holding the reaction mixture at a temperature greater than 49° C. to permit methylolation to occur, then holding the mixture at reflux to force methylolation,
   (c) adjusting the pH to the acid side, to a pH of 4.5 or higher, to initiate condensation and polymerization, and refluxing to a desired Gardner viscosity; then
   (d) cooling to a temperature below the boiling point of water and adjusting the pH to the alkaline side for final methylolation, and adding more urea to achieve an F/U mole ratio of 2.3:1 to 1.1:1.

2. A process in accordance with claim 1 wherein, in step (a), the elevated temperature is up to 99° C.

3. A process in accordance with claim 1 wherein, in step (b), the pH is adjusted to 6.9–7.8.

4. A process according to claim 3 wherein the pH is adjusted to 7.3–7.8.

5. A process according to claim 3 wherein, in step (b), the urea is added in a first increment to an F/U mole ratio of 3.0:1 to 1.5:1, then the reaction mixture is held with agitation at 50° C. to 80° C. to permit methylolation to occur, then the pH is readjusted if necessary to 6.9–7.8, then a second charge of urea is made to an F/U mole ratio of 2.5:1 to 1.5:1, then the mixture is held at reflux to force methylolation.

6. A process according to claim 5 wherein the reaction mixture is held at 50° C.–80° C. for approximately 30 minutes, and later at reflux for about 15 minutes.

7. A process according to claim 1 wherein, in step (c), the pH is adjusted to 5.2–6.8.

8. A process according to claim 7 wherein, after the pH adjustment, refluxing is continued to achieve a Gardner viscosity of D/E to T/U.

9. A process according to claim 1 wherein, in step (d), the pH is adjusted to 7.2–7.8.

10. A process according to claim 1 wherein, in step (a), the elevated temperature is 50° C. to 99° C., and wherein, in step (b), the pH is adjusted to 6.9–7.8, and wherein, after the addition of urea in step (b), the reaction mixture is held first at 50° C.–80° C. for a period of time, to promote methylolation, then at reflux, to force methylolation; and wherein, in step (c), the pH is adjusted to 5.2–6.8, and wherein, in step (d), the pH is adjusted to 7.2–7.8.

11. A process for preparing a urea-formaldehyde base resin having a formaldehyde to urea (F/U) mole ratio in the range from about 1.1:1 to about 2.3:1, which comprises:
- (a) adding urea to an acidic aqueous formaldehyde solution that has an initial pH of not above about 2.5, at a rate such that the temperature of the solution remains in the range from about 50° C. to about 99° C., until the F/U molar ratio is in the range from about 4.0:1 to about 2.5:1;
- (b) adjusting the pH of the reaction mixture to the range from about 6.9 to about 7.8;
- (c) adding more urea to the alkaline reaction mixture to achieve an F/U mole ratio in the range from about 3.0:1 to 1.8:1, while maintaining the temperature of the reaction mixture from 50° C. to about 80° C. for approximately 30 minutes;
- (d) adding more urea to the alkaline reaction mixture to achieve an F/U mole ratio in the range from about 2.5:1 to 1.5:1 and refluxing the reaction mixture for approximately 15 minutes;
- (e) adjusting the pH to the acidic range 5.2 to 6.8;
- (f) refluxing the acidified reaction mixture to achieve a desired Gardner viscosity in the range from about D/E to about T/U, then
- (g) cooling to below the boiling point of water and adjusting the pH to within the range from about 7.2 to about 7.8, and
- (h) adding more urea to the alkaline reaction mixture to achieve an F/U mole ratio in the range from about 2.3:1 to about 1.0:1.

12. A process according to claim 10 wherein, in step (b), the pH is adjusted to 7.3 to 7.8, and wherein the final mole ratio of the base resin is 1.6:1 to 1.1:1.

* * * * *